United States Patent
Dudler et al.

(10) Patent No.: US 12,201,056 B2
(45) Date of Patent: Jan. 21, 2025

(54) BAR RAIL FOR SIDE CUTTING UNIT

(71) Applicant: CLAAS Selbstfahrende Erntemaschinen GmbH, Harsewinkel (DE)

(72) Inventors: Heribert Dudler, Harsewinkel (DE); Josef Köckemann, Herzebrock-Clarholz (DE); Robert Tiemann, Spenge (DE); Lukas Eidhoff, Gütersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 784 days.

(21) Appl. No.: 17/388,632

(22) Filed: Jul. 29, 2021

(65) Prior Publication Data

US 2022/0053691 A1   Feb. 24, 2022

(30) Foreign Application Priority Data

Aug. 19, 2020   (DE) .......................... 102020121773.0

(51) Int. Cl.
| | |
|---|---|
| *A01D 34/23* | (2006.01) |
| *A01D 34/06* | (2006.01) |
| *A01D 34/135* | (2006.01) |
| *A01D 34/14* | (2006.01) |

(52) U.S. Cl.
CPC ............. *A01D 34/23* (2013.01); *A01D 34/06* (2013.01); *A01D 34/14* (2013.01); *A01D 34/135* (2013.01)

(58) Field of Classification Search
CPC ...... A01D 34/23; A01D 34/135; A01D 34/06; A01D 34/14
See application file for complete search history.

(56) References Cited

U.S. PATENT DOCUMENTS

| | | | | |
|---|---|---|---|---|
| 462,558 | A | * | 11/1891 | James .................... A01D 34/30 56/272 |
| 601,911 | A | * | 4/1898 | Stirling ................. A01D 34/14 56/302 |

(Continued)

FOREIGN PATENT DOCUMENTS

| | | | | |
|---|---|---|---|---|
| CN | 103974611 | A | * 8/2014 | ............ A01D 34/30 |
| DE | 3139601 | A1 | 4/1983 | |

(Continued)

OTHER PUBLICATIONS

Oohara_CN_103974611_A_I_-_English_Translation, 2014.*
European Search Report for European application No. 21181148.4-1004 mailed Dec. 10, 2021.

*Primary Examiner* — Thomas B Will
*Assistant Examiner* — Julia C Tran
(74) *Attorney, Agent, or Firm* — Lempia Summerfield Katz LLC

(57) ABSTRACT

A side cutting unit for a cutting unit of an agricultural harvesting machine. The side cutting unit comprises a support frame designed as a bar rail, wherein the bar rail supports, in the longitudinal direction, at least one oscillating knife bar using blade holding apparatuses, and at one end is coupled to a drive that causes the oscillating movement of the at least one knife bar, with the bar rail being designed as a one-piece profiled tube, such as an extruded profiled tube.

17 Claims, 5 Drawing Sheets

(56) References Cited

U.S. PATENT DOCUMENTS

| | | | | |
|---|---|---|---|---|
| 903,795 | A | * 11/1908 | Siegfried | A01D 34/135 |
| | | | | 56/297 |
| 2,146,399 | A | * 2/1939 | Landrey | A01D 34/135 |
| | | | | 56/297 |
| 2,637,158 | A | * 5/1953 | Hauswirth | A01D 34/20 |
| | | | | 56/307 |
| 2,664,690 | A | * 1/1954 | Huddle | A01D 34/135 |
| | | | | 56/297 |
| 2,722,798 | A | * 11/1955 | Spedding | A01D 34/20 |
| | | | | 56/298 |
| 3,136,109 | A | * 6/1964 | Templeton | A01D 34/13 |
| | | | | 56/307 |
| 3,514,933 | A | * 6/1970 | Beusink | A01D 34/02 |
| | | | | 56/298 |
| 3,577,716 | A | * 5/1971 | McCarty | A01D 34/135 |
| | | | | 56/297 |
| 3,722,196 | A | * 3/1973 | Templeton | A01D 34/16 |
| | | | | 56/298 |
| 2018/0084724 | A1 | 3/2018 | Fuchtling | |
| 2020/0008341 | A1 | 1/2020 | Madarasi et al. | |
| 2020/0367432 | A1 | 11/2020 | Fuchtling et al. | |

FOREIGN PATENT DOCUMENTS

| | | |
|---|---|---|
| DE | 3139601 C2 | 3/1985 |
| DE | 202016100325 U1 | 4/2017 |
| EP | 2647276 A1 | 10/2013 |
| EP | 2407019 B1 | 8/2014 |
| FR | 2805123 A1 | 8/2001 |

\* cited by examiner

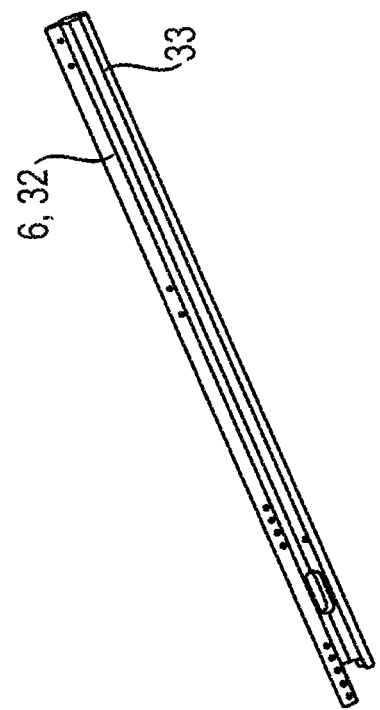
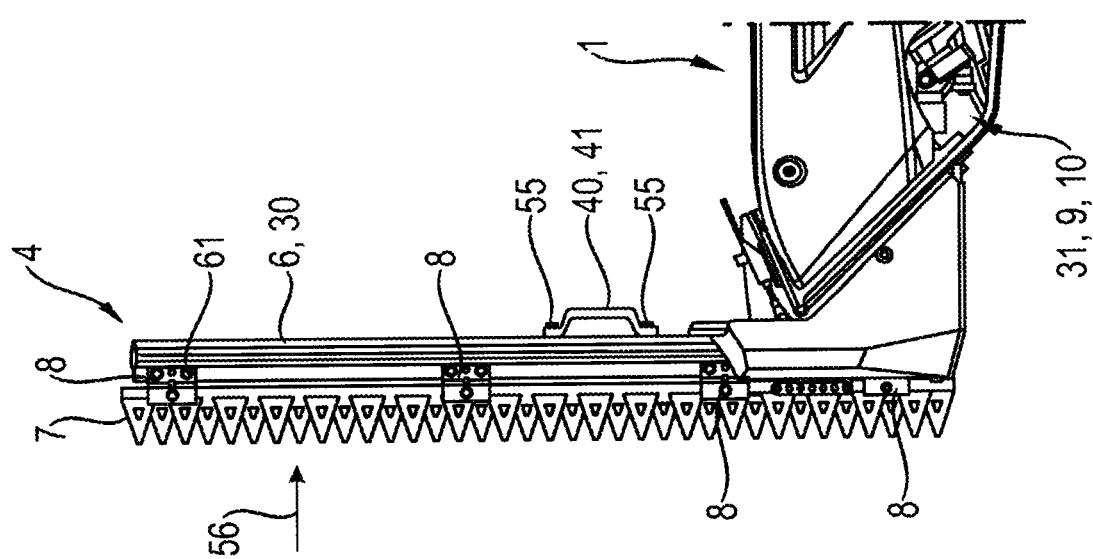

BAR RAIL FOR SIDE CUTTING UNIT

CROSS REFERENCE TO RELATED APPLICATION

This application claims priority under 35 U.S.C. § 119 to German Patent Application No. DE 102020121773.0 filed Aug. 19, 2020, the entire disclosure of which is hereby incorporated by reference herein.

TECHNICAL FIELD

The invention relates to a side cutting unit for a cutting unit of an agricultural harvesting machine.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Grain cutting units, that may be seated in so-called combines, may be equipped with side cutting units. Such side cutting units have the function of cutting free the grain crop to be harvested by the particular grain cutting unit in a vertical direction so that the cutting and conveying units of the grain cutting unit may easily cut and convey the crop to be harvested. In particular, such side cutting units may be used in harvesting canola since canola plants ready for harvesting are extremely intertwined with each other. Side cutting units may be adapted to the particular grain cutting units either on both sides or on one side.

Side cutting units may be constructed so that knife bars that oscillate against each other are seated by a bar structure, a so-called bar rail. For example, bar rail structures are disclosed in DE 31 39 601 C2 and EP 2 407 019 B1 that are composed of a box profile structure to lend the necessary stability to the side cutting unit and a bar-like structure for seating the oscillating knife bar.

To counteract the disadvantage of the deformation-prone bar-like structure, EP 2 647 276 omits the bar-like structure and attaches the oscillating knife bar by retaining plates directly to the box profile structure.

DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein:

FIGS. 3*a-d* illustrate detailed views of the bar rail.

DETAILED DESCRIPTION

Figure 1:
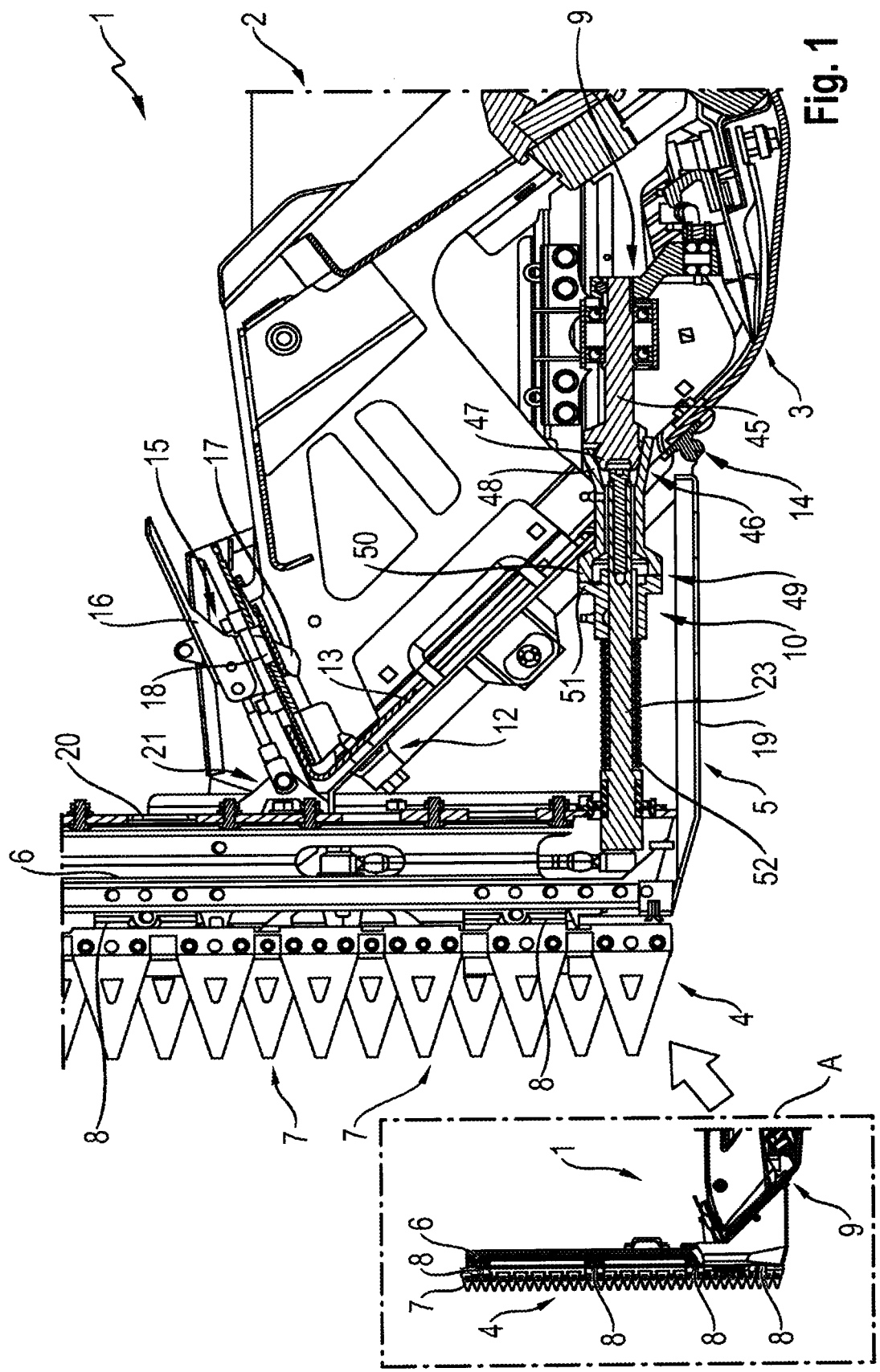
FIG. 1 illustrates a schematic representation of the side cutting unit.

As discussed in the background, certain structures are composed of a box profile structure to lend the necessary stability to the side cutting unit and a bar-like structure for seating the oscillating knife bar. However, such bar rail structures have the disadvantage that they possess a large transverse extension, which on the one hand introduces high bending moments from the cutting force into the box profile structure and, on the other hand, have an extremely high mass.

Further, as discussed in the background, certain structures omit the bar-like structure and attach the oscillating knife bar by retaining plates directly to the box profile structure. However, such structures have the disadvantage that the cutting forces must be introduced through a long lever arm into the box structure so that the particular box structure must be designed extremely stable, which ultimately further increases the mass of the entire side cutting unit.

It is therefore the object of the invention to avoid the described disadvantages of the prior art and in particular create a side blade structure that has a compact design which enables a lower overall mass of the particular side cutting unit.

In one or some embodiments, the side cutting unit may include a support frame designed as a bar rail, wherein the bar rail is designed as a one-piece profiled tube, such as an extruded profiled tube.

Thus, in one or some embodiments, the side cutting unit of a cutting unit of an agricultural harvesting machine may comprise a support frame designed as a bar rail, wherein the bar rail supports, in the longitudinal direction, at least one oscillating knife bar using one or more blade holding apparatuses and at one end is coupled to a drive that causes the oscillating movement of the at least one knife bar, and the bar rail is designed as a one-piece profiled tube, such as an extruded profiled tube, which may ensure that the side cutting unit has a compact design and which enables a low overall mass of the particular side cutting unit.

In one or some embodiments, the profiled tube comprises reinforcing bars on the inside, wherein the reinforcing bars divide the cross-section of the profiled tube into a middle region and one or more seating regions assigned thereto on the outside. In particular, this has the effect that the profiled tube may require less installation space and may still be multifunctionally equipped with a wide range of attachments. In this context, it is advantageous if at least one seating region is designed as guide rail of a holding element that is adjustable in position, such as a handle, and the other seating region is designed as a seat for the blade holding apparatuses.

In one or some embodiments, the middle region of the profiled tube forms a U-profile structure with one of the reinforcing bars and transitions into flanks that converge towards each other in the direction of the other reinforcing bar. In particular, this has the effect that the bar rail has a high rigidity, and the cutting forces to be conducted into the frame may be transmitted without wear-promoting deflection jumps.

Thus, the seating region, which may be designed as a guide rail of a holding element, may be adjustable in position and may have converging flanks in a cross-section. The seating region may comprise a guide cavity in its interior to seat connecting elements in a positionally variable manner, thereby ensuring or enabling that a handle may be positioned on the side cutting unit so that the handle may be optimally mounted or removed depending on the conditions at the particular cutting unit and/or depending on the body size of the user.

To prevent material from collecting in the region of the side blades, the convergence of the converging flanks may be directed toward the flow of material.

In one or some embodiments, the seating region designed as a seat for the blade holding apparatuses forms a box profile with the reinforcing bar adjacent thereto to seat the blade holding apparatuses. Such a design has many advantages. Accordingly, several knife bars may be seated on the same bar rail, for example if the knife bar is designed as a double blade, and each of the double blades may be positioned on a flank of the seating region seating the knife bar. Moreover, the bar rail may be highly stable in the region for introducing cutting forces and, at same time, the blade holders may be easily fastened to the bar rail.

A particularly low mass of a side cutting unit may achieved when, in one or some embodiments, the bar rail, designed as a one-part profiled tube such as an extruded profiled tube, comprises (or consists of) aluminum.

A structure of the bar rail that is suitable with respect to force and production may result when the wall thickness of the horizontal sections of the middle region is greater than the wall thicknesses of one or more of the other cross-sectional sections, wherein the wall thickness of the horizontal sections of the middle region is approximately 4 mm, and wherein one, some or all other wall thicknesses are approximately 3 mm.

In one or some embodiments, the knife bar is designed as a double blade, and each of the double blades is positioned on a flank of the seating region seating the knife bar.

In one or some embodiments, the side cutting unit may be assigned to a cutting unit of known design either only on one side, or on both sides of the cutting unit at same time. This may increase the flexibility of use of the cutting unit of the known design, such as when the cutting unit is used on a combine.

FIG. 1 schematically portrays an example of a partial view of a cutting unit 1 with at least one side cutting unit 4 arranged or positioned thereupon. Example cutting units are disclosed in US Patent Application Publication No. 2018/0084724 A1, US Patent Application Publication No. 2020/0008341 A1, and US Patent Application Publication No. 2020/0367432 A1, each of which are incorporated by reference herein.

The cutting unit 1 may be seated on an agricultural harvesting machine (not shown), such as a combine, and is driven thereby. To this end, the cutting unit 1 may be coupled to a mechanical drivetrain of the combine. Moreover, a connection of the cutting unit 1 to a hydraulic system of the combine may be provided in order to hydraulically drive components of the cutting unit 1, such as for example a reel. The cutting unit 1 comprises a frame 2 and a cutting unit trough arranged or positioned thereupon. In a manner known to one of skill in the art, the cutting unit trough is upstream from a cutting table, and the reel is guided by using arms on the cutting unit trough and is adjustable relative thereto in or opposite to a mowing direction. A cutter bar 3 that is driven in an oscillating manner may be arranged or positioned on the cutting table.

An end of the at least one side cutting unit 4 may be releasably arranged or positioned on the frame 2. The side cutting unit 4 may extend substantially vertically relative to the cutter bar 3. In one or some embodiments, the side cutting unit 4 comprises a bar rail 6 that is arranged or positioned on a support frame 5 and is described in greater detail below. The side cutting unit 4 may be releasably attachable to the frame 2 of the cutting unit 1 using the support frame 5. The bar rail 6 supports in a longitudinal direction at least one oscillatingly driven knife bar 7, which is described further below, using blade holding apparatuses 8. In the depicted embodiment, two knife bars 7 are arranged or positioned parallel to each other. An output 9 is arranged or positioned on at least one outer end of the cutter bar 3 and may absorb the oscillating drive movement of the cutter bar 3. When there are side cutting units 4 arranged or positioned on both sides of the frame 2 of the cutting unit 1, an output 9 may be provided in each case.

The bar rail 6 may be coupled at one end to the output 9, causing the oscillating drive movement of the at least one knife bar 7, on the cutter bar 3 using a drive device 10. In one or some embodiments, the drive device 10 is arranged or positioned on the lower end of the bar rail 6 facing the cutter bar 3. This may keep the force transmission path short between the output 9 via the drive device 10 to the bar rail 6.

In one or some embodiments, the support frame 5 is substantially triangular. In this case, the support frame 5 substantially has the shape of a right triangle. The support frame 5 includes a frame segment 13 that is arranged or positioned obliquely at an angle to the knife bar 7. The frame segment 13 extends from a lower articulation point 14 toward an upper attachment point 15 on the frame 2 of the cutting unit 1. The depiction in FIG. 1 shows the side cutting unit 4 in its position locked on the cutting unit 1. In this regard, a quick release fastener 16 is arranged or positioned on the support frame 5 that is releasably connected to the frame 2 of the cutting unit 1. The quick release fastener 16 has a hook-shaped section 17 that may be brought into engagement with a corresponding recess 18 in the frame 2. The quick release fastener 16 may be designed as a type of toggle lever assembly. The hook-shaped section 17, engaging in the recess 18 to fix the support frame 5, allows the support frame 5 to be connected to the frame 2 free of play and torque-resistant.

The support frame 5 has a frame section 19 extending substantially in a horizontal direction above which the components of the drive device 10 are located. Another frame section 20 extends perpendicular to the frame section 19. The frame segment 13 is connected at the end to the frame section 19 or to the frame section 20. At an upper articulation point 21, the quick release fastener 16 is articulated to the frame section 20 extending substantially in a vertical direction. The upper articulation point 21 lies above the region in which the frame segment 13 is connected at the end to the frame section 20.

The side cutting unit 4 receives at least one first bearing element 11 (see FIGS. 2a-b) and a second bearing element 12. The at least one first bearing element 11 is configured to conduct forces arising at the at least one oscillating knife bar 7 distributed over the length of the bar rail 6 from the bar rail 6 into the support frame 5. The at least one second bearing element 12 is configured to at least dampen the vibrations transmitted from the cutter bar 3 to the side cutting unit 4.

The output 9 has an output shaft 45, on the end of which a first coupling element 47 of a first coupling 46 is arranged or positioned. The drive device 10 has a corresponding second coupling element 48 of the first coupling 46 that may be brought into engagement with the first coupling element 47. In one or some embodiments, the first coupling element 47 and the second coupling element 48 have axial cutouts arranged or positioned offset at an angle in the peripheral direction, or projections that extend radially outward. In particular, the projections of the first coupling element 47 and the cutouts in the second coupling element 48 are arranged or positioned offset from each other at an angle of approximately 120°. Accordingly, in one or some embodiments, the two coupling elements 47, 48 of the first coupling 46 may only be brought into engagement when the driveshaft 23 and the output shaft 45 are in a specific position. The drive device 10 has a second coupling 49 that is designed as an overload coupling. The second coupling 49 comprises a first coupling element 50 and a second coupling element 51 that are arranged or positioned flush on a common shaft, such as the driveshaft 23. A pressure spring 52 is arranged or positioned coaxially on the driveshaft 23 adjoining the second coupling element 51. The pressure spring 52 abuts a radial step on the driveshaft 23 and a housing section of the second coupling 49. Using the pressure spring 52, the second coupling 49 is pretensioned when the side cutting unit 4 is mounted.

Figure 2A:
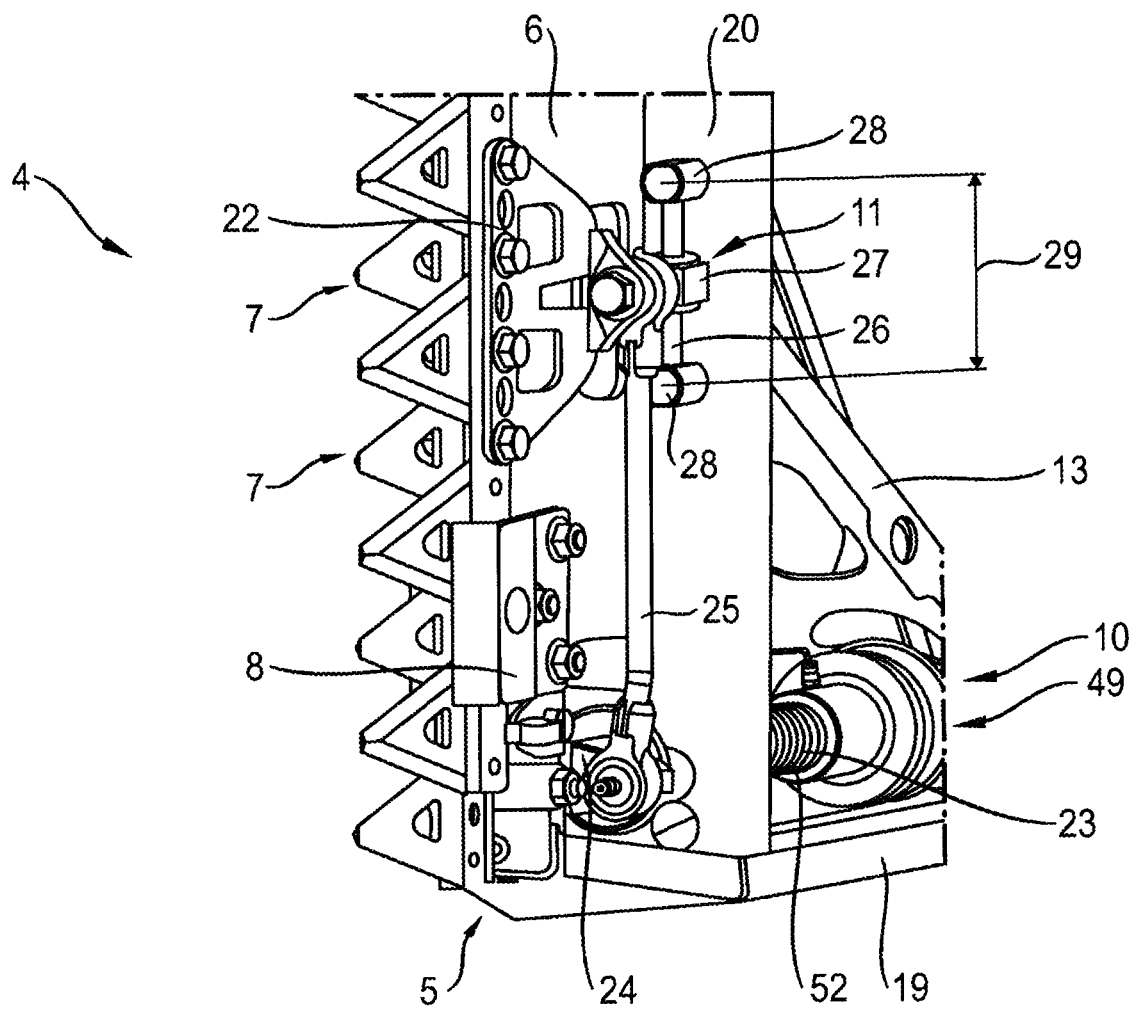
FIGS. 2*a-b* illustrate detailed views of the side cutting unit according to FIG. 1.
Figure 2B:
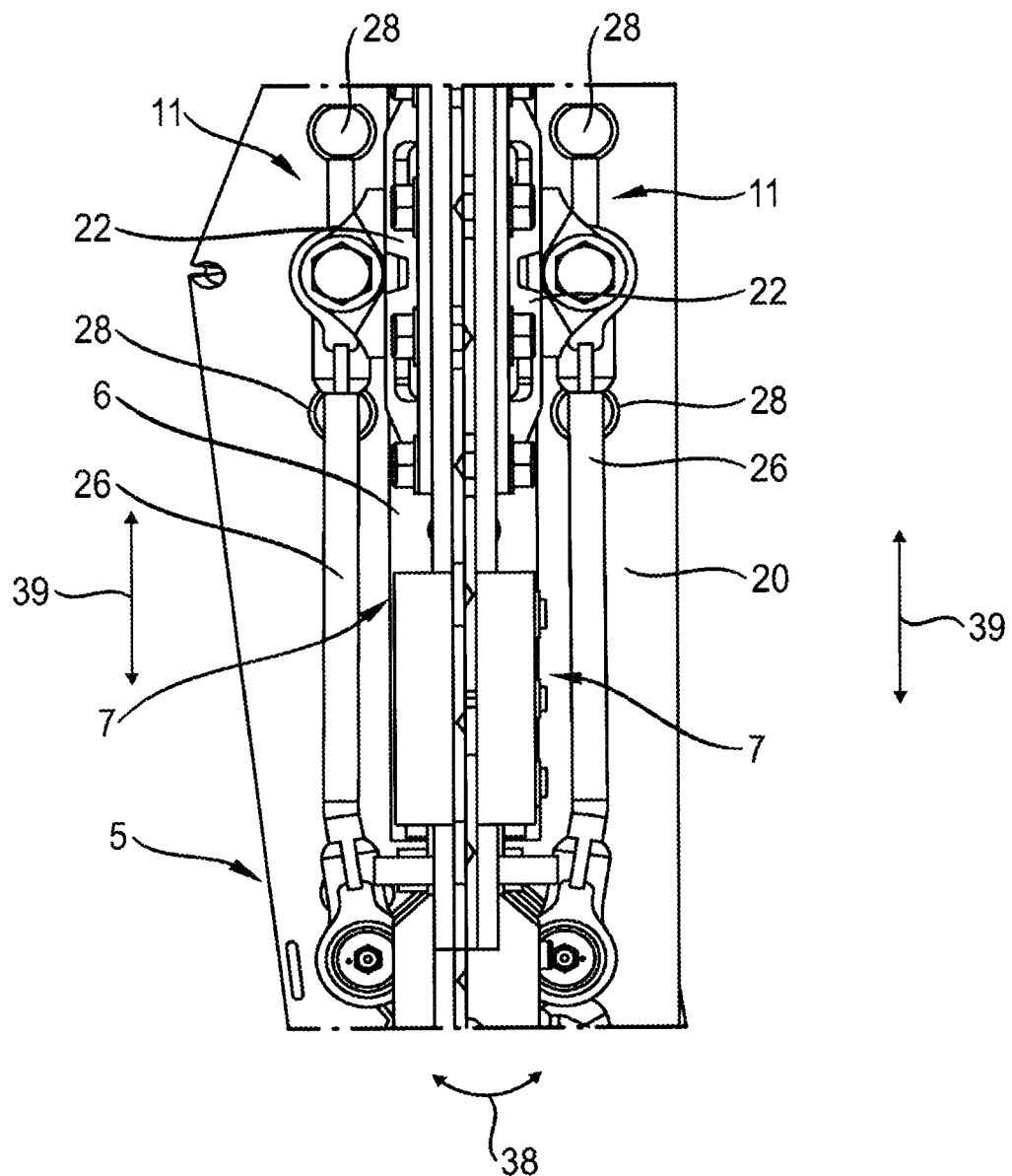

The depiction in FIGS. 2a-b shows a schematic example of a perspective partial view of a lower region of the support frame 5 of the side cutting unit 4. A two-sided lever 24 is arranged or positioned on a driveshaft 23 of the drive device 10. Two coupling rods 25 are articulated to the lever 24 at the free ends of the lever 24 at a distance from each other and eccentric to the longitudinal axis of the driveshaft 23, wherein a coupling rod 25 is assigned to each of the oscillatingly moved knife bars 7. A transmission element 22 is arranged or positioned at the opposite end of the particular coupling rod 25 and serves to transmit the oscillating drive movement to the bar rail 6. The at least one first bearing element 11 is designed as a linear guide that runs parallel to the bar rail 6. The transmission element 22 and the coupling rod 25 are guided from the first bearing element 11 in an axial direction. The particular first bearing element 11 has a guide rod 26 that is arranged or positioned axially parallel to the bar rail 6. The transmission element 22 and the coupling rod 25 slide in an axial direction up and down along the guide rod 26. In this regard, a guide element 27 is provided that encloses the guide rod 26 in a form fit. On the guide element 27, the coupling rod 25 is articulated to a shaft running perpendicular to the guide rod 26. At its opposing ends, the guide rod 26 is fixed to the support frame 5. To this end, the first bearing element 11 comprises two fastening points 28 between which the guide rod 26 is arranged or positioned. The fastening points 28 are arranged or positioned on the support frame 5 at a distance 29 from each other, wherein the distance 29 of the fastening points 28 to each other is greater than the amplitude of the oscillating movement of the knife bar 7.

The side cutting unit 4 according to FIGS. 2a-b has two knife bars 7 arranged or positioned as double blades, each of which is assigned a first bearing element 11. The particular first bearing element 11 restricts the number of degrees of freedom of the coupling rod 25 connected thereto, and therefore of the transmission element 22 and the bar rail 6 arranged or positioned thereupon, to two translational degrees of freedom.

FIGS. 3a-b illustrate the bar rail 6 in detail according to one or more embodiments. According to FIGS. 3a-b, the side cutting unit 4 is assigned to a cutting unit 1 in the manner described above. In one or some embodiments, the bar rail 6 forms the support frame 30 of the oscillatingly driven knife bar 7, wherein depending on the design of the side cutting unit 4, either knife bars 7 arranged in pairs, so-called double blades, or a single knife bar 7 may be provided. The knife bars 7 are fastened using blade holding apparatuses 8 to the bar rail 6 in a manner described in greater detail below. In the already described manner, the knife bars 7 are coupled at one end, in this case at the bottom side, to a drive 31 that causes the oscillating movement of the at least one knife bar, or knife bars arranged in pairs, and comprises (or consists of) the output 9 and the drive device 10. According to one or some embodiments, the bar rail 6 is designed as a one-part profiled tube 32, wherein the one-part shape is preferably achieved by extrusion so that the profiled tube 32 may be formed as an extruded profiled tube 33. From the vantage point of lightweight design, the profiled tube 32, such as the extruded profiled tube 33, may comprise (or consists of) aluminum.

Figure 3D:
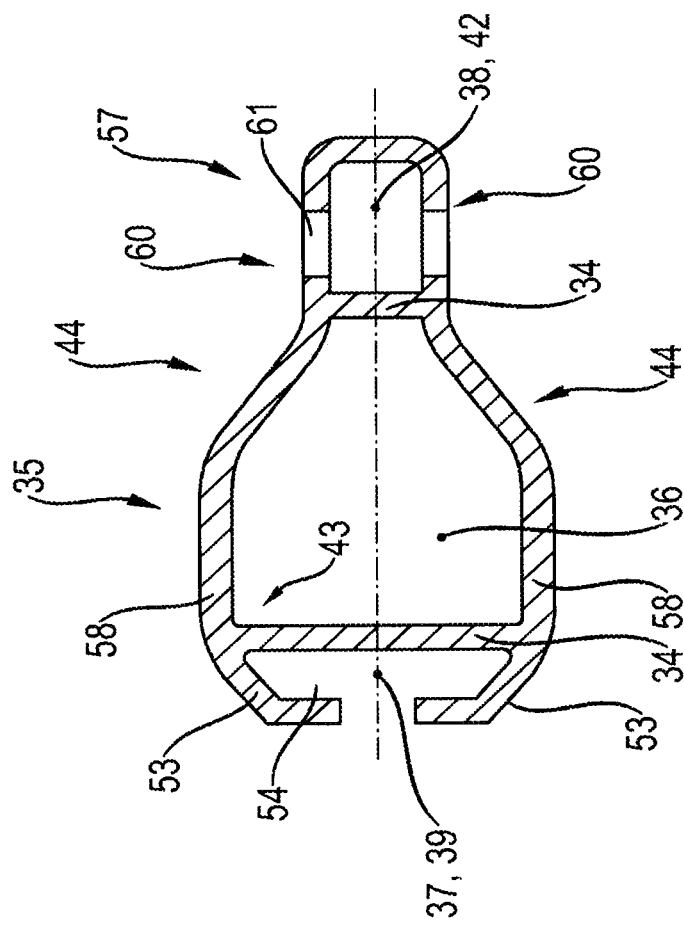
Figure 3C:
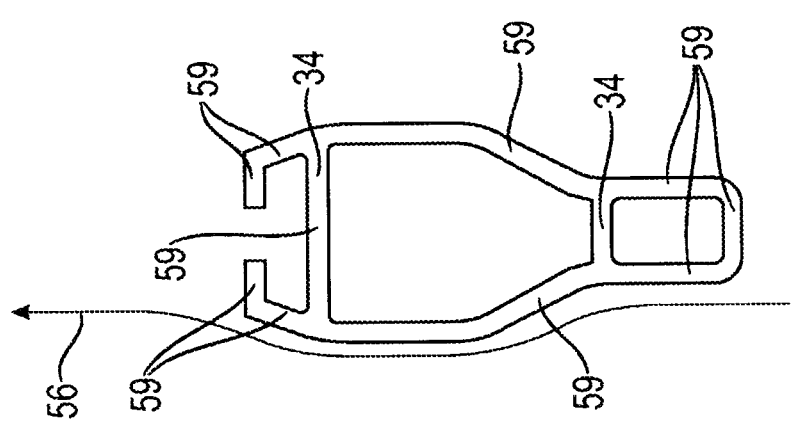

Details of the profiled tube 32 are shown in FIGS. 3c-d. In the following, only one profiled tube 32 will be referenced for reasons of simplicity, wherein the design as an extruded profiled tube 33 is also always included in this case. Though, other or multiple profiled tubes are contemplated. The inside of the profiled tube 32 comprises reinforcing bars 34, wherein the reinforcing bars 34 divide the cross-section 35 of the profiled tube 32 into a plurality of regions, such as a middle region 36 and first and second seating regions 37, 38 assigned thereto on the outside. The first seating region 37 is designed as a guide rail 39. A retaining element 40 designed as a handle 41 may be adjustably moved and secured in position in this guide rail 39 so that the handle 41 may be positioned in a suitable for mounting and removal depending on the user. The other seating region 38 is designed as a seat 42 for the blade holding apparatuses 8 in a manner described below in greater detail.

The middle region 36 of the profiled tube 32 forms a U-profiled structure 43 with at least one of the reinforcing bars 34 such as the reinforcing bar 34 assigned to the first seating region 37 so that the bar rail 6 has a high rigidity. Moreover, the middle region 36 is such that it transitions in the direction of the other reinforcing bar 34 into mutually converging flanks 44. This has, in particular, the effect that the cutting forces to be conveyed from this seating region may be conveyed into the bar rail 6 without a sudden deflection.

A structure of the profiled tube 32 (that is suitable with respect to force and production) also results when the first seating region 37 (designed as a guide rail 39) of the retaining element 40 (that is adjustable in position) also has converging flanks 53 in a cross-section, and comprises a guide cavity 54 in its interior to seat connecting elements 55 in a positionally variable manner (e.g., when these are screw heads in one instance). In this regard, one or more structural aspects of the profiled tube 32 may contribute to its suitability with respect to force and production.

The convergence of the converging flanks 44, 53 is moreover directed in direction of flow of material 56 so that the flow of material off the bar rail 6 is supported, and congestion of material in the region of the bar rail is simultaneously reduced or avoided.

The second seating region 38, which may be designed to seat the blade holding apparatuses 8, forms a box profile 57 with the reinforcing bar 34 adjacent thereto to seat the blade holding apparatuses 8.

Moreover, in one or some embodiments, the wall thickness of the horizontal sections 58 of the middle region 36 may be greater than the wall thicknesses of the other cross-sectional sections 59 (e.g., the wall thickness of the horizontal sections 58 of the middle region 36 may be 4 mm, and some or all other wall thicknesses may be 3 mm).

If the knife bars 7 are designed as double blades as already described, each knife bar 7 may be positioned on a flank 60 of the second seating region 38 seating the knife bar 7 in that the particular blade holding apparatus 8 are releasably fastened using threaded connections 61 to the second seating region 38.

In one or some embodiments, the side cutting unit 4 may either be positioned on one side or on both sides of a cutting unit, wherein the cutting unit, as described, may be used on an agricultural harvesting machine designed as a combine.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Cutting unit
2 Frame
3 Cutter bar
4 Side cutting unit
5 Support frame
6 Bar rail
7 Knife bar
8 Blade holding apparatus
9 Output
10 Drive device
11 First bearing element
12 Second bearing element
13 Frame segment
14 Articulation point
15 Fastening point
16 Quick clamp device
17 Hook-shaped section
18 Recess
19 Frame section
20 Frame section
21 Articulation point
22 Transmission element
23 Drive shaft
24 Lever
25 Coupling rod
26 Guide rod
27 Guide element
28 Fastening point
29 Distance
30 Support frame
31 Drive
32 One-part profiled tube
33 Extruded profiled tube
34 Reinforcing bar
35 Cross section
36 Middle region
37 First seating region
38 Second seating region
39 Guide rail
40 Retaining element
41 Handle
42 Seat
43 U-profile structure
44 Converging flank
45 Output shaft
46 First coupling
47 First coupling element
48 Second coupling element
49 Second clutch
50 First coupling element
51 Second coupling element
52 Pressures spring
53 Converging flank
54 Guide cavity
55 Connecting elements
56 Direction of material flow
57 Box profile
58 Horizontal sections
59 Other cross-sectional sections
60 Flank
61 Threaded connection

What is claimed is:

1. A side cutting unit of a cutting unit of an agricultural harvesting machine comprising:
a support frame designed as a bar rail, wherein the bar rail supports, in a longitudinal direction, at least one oscillating knife bar using one or more blade holding apparatuses and at one end is coupled to a drive that causes an oscillating movement of the at least one oscillating knife bar,
wherein the bar rail is designed as a one-piece profiled tube,
wherein an inside of the profiled tube comprises a plurality of reinforcing bars, and
wherein the plurality of reinforcing bars divide a cross-section of the profiled tube into a middle region and at least two seating regions on either side of the middle region.

2. The side cutting unit of claim 1, wherein the bar rail is designed as an extruded profiled tube.

3. The side cutting unit of claim 1, wherein the at least two seating regions abut the middle region.

4. The side cutting unit of claim 1, wherein one of the at least two seating regions is configured as a guide rail of a holding element that is adjustable in position; and
wherein another of the at least two seating regions is configured as a seat for the one or more blade holding apparatuses.

5. The side cutting unit of claim 4, wherein the at least one oscillating knife bar comprises a double blade, with each of the double blades being positioned on a flank of the another of the at least two seating regions seating the at least one oscillating knife bar.

6. The side cutting unit of claim 1, wherein the middle region of the profiled tube forms a U-profile structure with at least one of the reinforcing bars and transitions into flanks that converge towards each other in a direction of another reinforcing bar.

7. The side cutting unit of claim 1, wherein one of the at least two seating regions configured as a guide rail of a retaining element that is adjustable in position has converging flanks in a cross-section, and comprises a guide cavity in its interior to seat one or more connecting elements in a positionally variable manner.

8. The side cutting unit of claim 7, wherein convergence of the converging flanks is in a direction of flow of material.

9. The side cutting unit of claim 1, wherein one of the at least two seating regions is configured as a seat for the one or more blade holding apparatuses and forms a box profile with at least one of the plurality of reinforcing bars adjacent thereto to seat the one or more blade holding apparatuses.

10. The side cutting unit of claim 1, wherein wall thickness of a horizontal section of the middle region is greater than wall thicknesses of one or both of the at least two seating regions, the horizontal section being perpendicular to one of the plurality of reinforcing bars that define the middle region.

11. The side cutting unit of claim 2, wherein the extruded profiled tube comprises aluminum.

12. A method of operating a side cutting unit of a cutting unit of an agricultural harvesting machine, the method comprising:
  using the side cutting unit that is seated on one or both side regions of the cutting unit, the side cutting unit including:
    a support frame designed as a bar rail, wherein the bar rail supports, in a longitudinal direction, at least one oscillating knife bar using one or more blade holding apparatuses and at one end is coupled to a drive that causes an oscillating movement of the at least one oscillating knife bar,
    wherein the bar rail is designed as a one-piece profiled tube,
    wherein an inside of the profiled tube comprises a plurality of reinforcing bars, and
    wherein the plurality of reinforcing bars divide a cross-section of the profiled tube into a middle region and at least two seating regions on either side of the middle region.

13. The method of claim 12, wherein the agricultural harvesting machine comprises a combine.

14. The method of claim 12,
  wherein one of the at least two seating regions acts as a guide rail of a holding element that is adjustable in position; and
  wherein another of the at least two seating regions acts as a seat for the one or more blade holding apparatuses.

15. The method of claim 14, wherein the one of the at least two seating regions that acts as the guide rail of a retaining element is adjustable in position and has converging flanks in a cross-section, and comprises a guide cavity in its interior to seat one or more connecting elements in a positionally variable manner.

16. The method of claim 15, wherein convergence of the converging flanks is in a direction of flow of material.

17. The method of claim 12, wherein the plurality of reinforcing bars divide a cross-section of the profiled tube into a middle region and at least two seating regions on either side of the middle region; and
  wherein one of the at least two seating regions acts a seat for the one or more blade holding apparatuses and forms a box profile with at least one of the plurality of reinforcing bars adjacent thereto to seat the one or more blade holding apparatuses.

* * * * *